(12) United States Patent
Emmott

(10) Patent No.: US 7,716,868 B2
(45) Date of Patent: May 18, 2010

(54) FISHING LURE

(76) Inventor: Walter E. Emmott, 7313 Helmsley La., Houston, TX (US) 77040

( * ) Notice: Subject to any disclaimer, the term of this patent is extended or adjusted under 35 U.S.C. 154(b) by 85 days.

(21) Appl. No.: 11/807,831

(22) Filed: May 30, 2007

(65) Prior Publication Data

US 2008/0295384 A1  Dec. 4, 2008

(51) Int. Cl.
*A01K 85/00* (2006.01)
(52) U.S. Cl. .................. 43/42.06; 43/43.14; 43/42.22; 43/42.31; 43/42.33
(58) Field of Classification Search ............. 43/42.06, 43/43.14, 42.35, 17.6, 42.12, 42.22, 42.31, 43/42.33
See application file for complete search history.

(56) References Cited

U.S. PATENT DOCUMENTS

| | | | |
|---|---|---|---|
| 1,740,335 A | 12/1929 | Hamilton | |
| 2,127,761 A | 8/1938 | Beck | |
| 2,439,123 A | 4/1948 | Bell | |
| 2,510,566 A | 6/1950 | Flaherty | |
| 2,517,620 A * | 8/1950 | Anderson | 43/42.06 |
| 2,560,733 A * | 7/1951 | Morris | 43/42.06 |
| 2,573,399 A | 10/1951 | Cannon | |
| 2,573,592 A * | 10/1951 | Nickel | 43/42.09 |
| 2,769,267 A | 11/1956 | Ansley | |
| 2,951,308 A | 9/1960 | Kent | |
| 2,994,983 A | 8/1961 | Best | |
| 3,540,144 A | 11/1970 | Gurka | |
| 3,757,455 A | 9/1973 | Strader | |
| 3,762,092 A | 10/1973 | Bercz et al. | |
| 3,987,575 A | 10/1976 | Morita | |
| 4,098,017 A | 7/1978 | Hall | |
| 4,163,338 A | 8/1979 | Lucarini | |
| 4,823,497 A * | 4/1989 | Pierce | 43/17.6 |
| 5,036,617 A | 8/1991 | Waldrip | |
| 5,142,811 A * | 9/1992 | Freeman | 43/42.53 |
| 5,678,349 A | 10/1997 | Pacora | |
| 6,668,482 B1 * | 12/2003 | Ruffin et al. | 43/42.06 |
| 6,779,293 B1 * | 8/2004 | Rice | 43/42.06 |
| 6,912,808 B1 | 7/2005 | Mak | |
| 7,114,280 B2 | 10/2006 | Turner | |
| 7,174,669 B1 | 2/2007 | Kallas | |

* cited by examiner

*Primary Examiner*—Christopher P Ellis

(57) ABSTRACT

A fishing lure comprising a body having a hollow cavity and adapted to be connected to a fishing line, the body having a transparent portion at least partially exposing the cavity, the body having an opening into the cavity and an insert receivable through the opening and having at least a portion extending into the cavity, the insert comprising a spine and a flexible outer structure of a colored material attached to the spine.

12 Claims, 2 Drawing Sheets

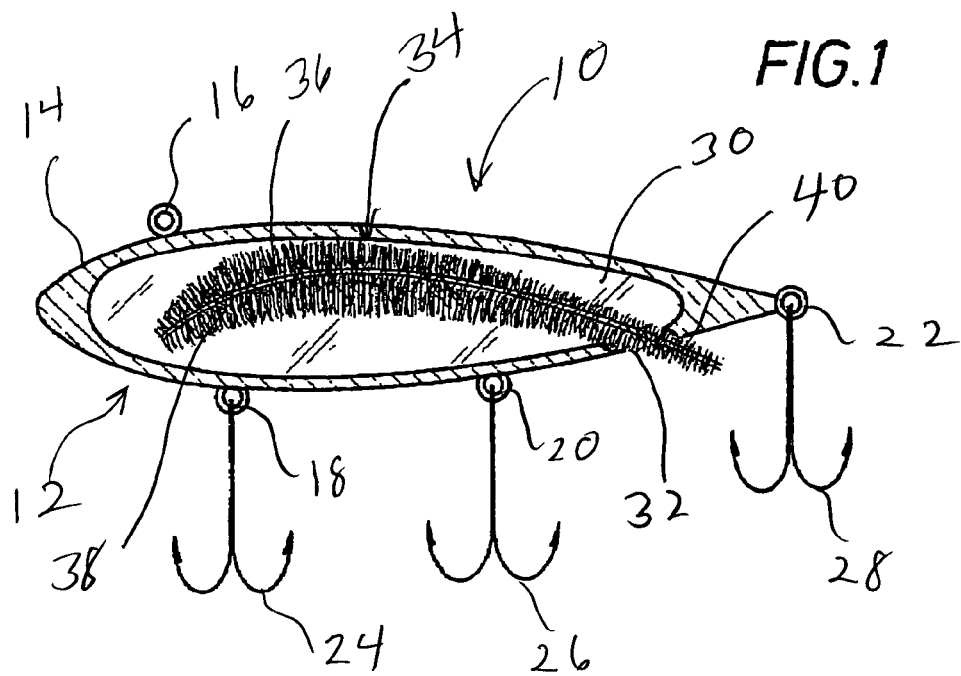
FIG. 1
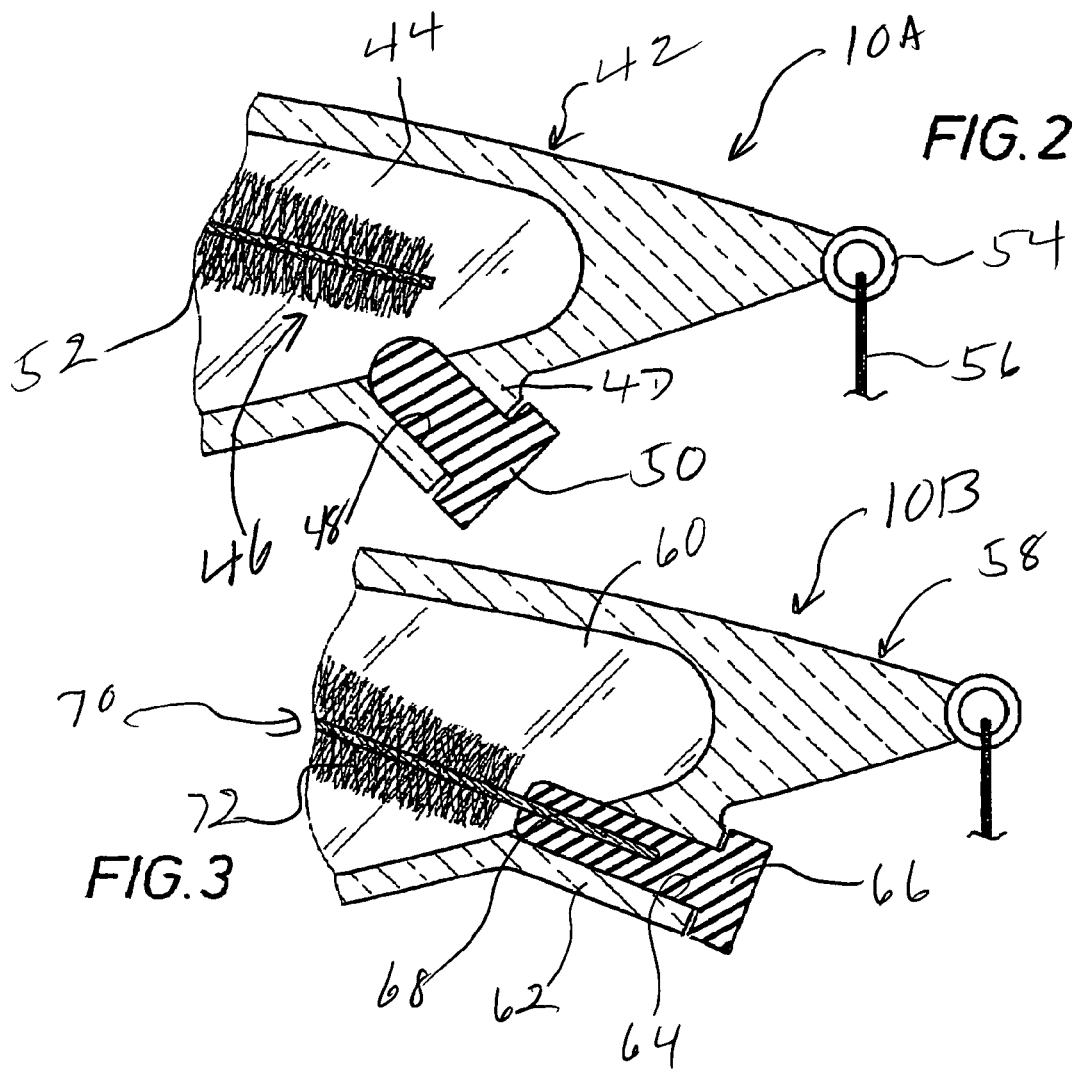
FIG. 2
FIG. 3

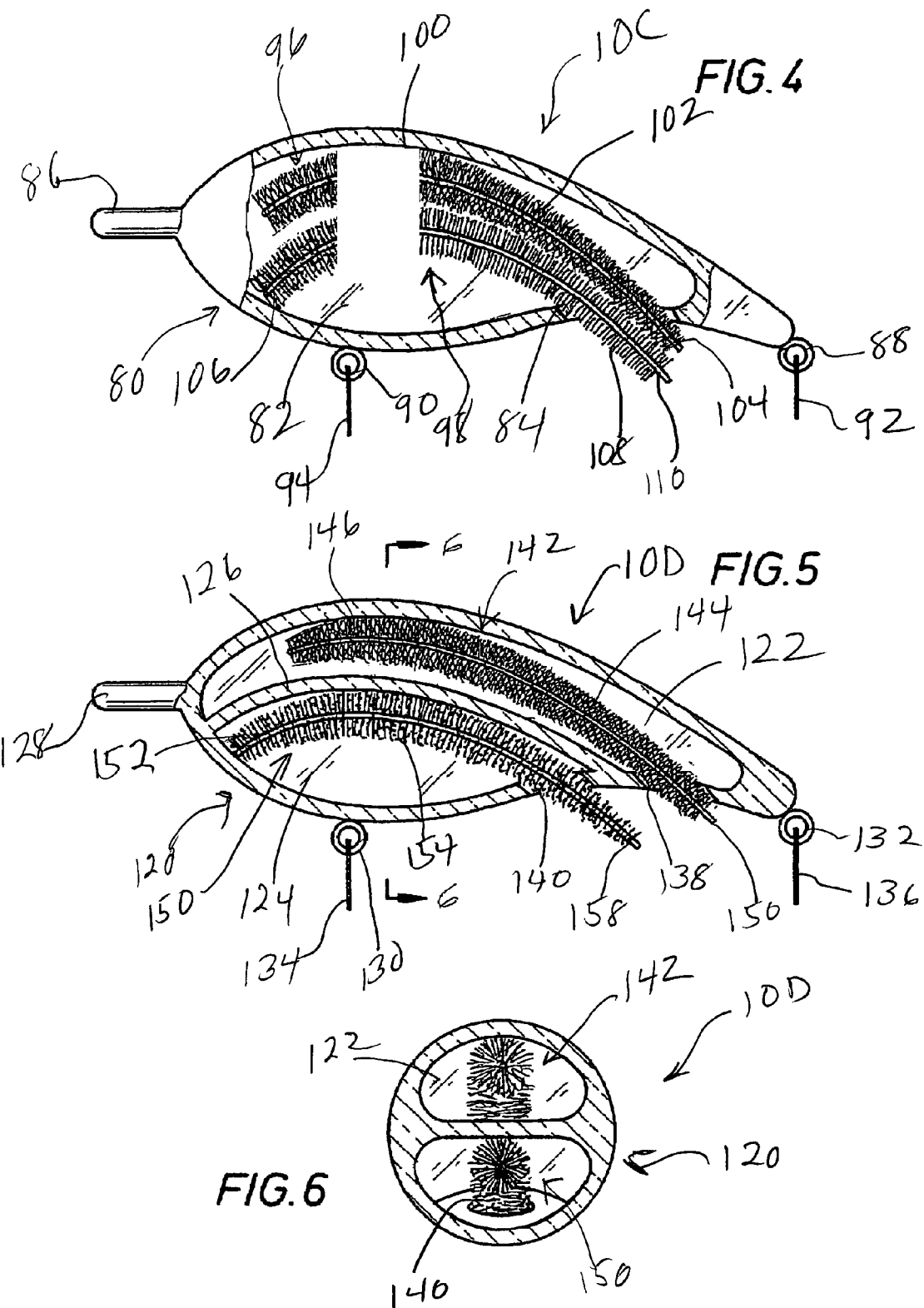

FISHING LURE

BACKGROUND OF THE INVENTION

FIELD OF THE INVENTION

The present invention relates to an artificial fishing lure for attracting fish and more particularly to a fishing lure which can be used with inserts in order to change the appearance of the lure.

It is well known among fisherman that different game fish show preferences for specific types of prey fish in terms of colors, patterns, shapes or other appearance characteristics. These preferences may vary depending upon the time of day, weather conditions, season of the year, location of the game fish, type of game fish, etc. Accordingly, fishermen who utilize artificial lures frequently have a dizzying array of lures of various shapes, colors, patterns and other appearance indicia. Not only is it expensive to have such a large number of lures, they may not be readily accessible to the fishermen. For example, fishermen who wade along shorelines or the like generally can only carry with them a limited number of lures.

Additionally, since different fishing lures are needed to adapt to changing conditions or for fishing for different fish, the angler must be prepared to change lures quickly several times until one of a desired color, shape, etc. to which the desired game fish is attracted. In the case of multiple lures, each time the lure has to be changed the previous lure must be removed from the fishing line and the replacement lure attached. This activity, particularly in the case where the fisherman is wading, can be difficult and frequently results in injury to the fisherman from hooks and the lures.

Numerous artificial fishing lures have been proposed with an aim towards changing the appearance of the lure, e.g., shape, color, etc. Exemplary of patents, particularly the type which employ inserts to change appearance, include U.S. Pat. Nos. 1,740,335; 2,510,566; 3,762,092; 5,036,617; 5,678,349; and 7,114,280.

SUMMARY OF THE INVENTION

In one respect the present invention provides a fishing lure comprising a body having a hollow cavity and adapted to be connected to a fishing line. The body has a transparent portion which at least partially exposes the cavity such that a non-transparent object in the cavity can readily be seen from outside the lure body. There is an opening in the lure body into the cavity. An insert is receivable through the opening and has at least a portion extending into the cavity, the insert having a spine and a flexible, outer structure of a colored material attached to the spine.

The foregoing objects, features and advantages of the present invention, as well as others, will be more fully understood and better appreciated by reference to the following drawings, specification and claims.

BRIEF DESCRIPTION OF THE DRAWINGS

FIG.1 is an elevational view, partly in section, showing one embodiment of the fishing lure of the present invention.

FIG.2 is a partial, elevational view, partly in section, of another embodiment of the fishing lure of the present invention.

FIG.3 is a partial, elevational view, partly in section, of another embodiment of the fishing lure of the present invention.

FIG.4 is an elevational view, partly in section, of another embodiment of the fishing lure of the present invention.

FIG.5 is an elevational view, partly in section, of another embodiment of the fishing lure of the present invention; and FIG.6 is a view taken along the lines 6-6 of FIG.5.

DETAILED DESCRIPTION OF PREFERRED EMBODIMENTS

Referring first to FIG.1, the artificial lure of the present invention, shown generally as 10, comprises a body shown generally as 12. Body 12 has an outer surface 14 to which is attached an eyelet 16 so that lure 10 can be attached to a fishing line, swivel or the like, and a series of eyelets 18, 20 and 22 to which a series of hooks 24, 26 and 28, respectively, are attached. Lure body 12 has an internal cavity 30 which is accessible through an opening 32 extending through lure body 12. As seen, lure body 12 is of a transparent material, e.g., a plastic, such that cavity 30 can be viewed from outside the lure body. In this regard, although lure body 12 can be made completely of a transparent material, it is only necessary that at least a portion of the lure body which overlays or exposes cavity 30 be made of such a transparent material such that the cavity 30 is viewable or visible from outside of lure body 12. The term "transparent" as used herein is intended to include translucent as well as all degrees of light transmittance short of being opaque. Thus, transparent is not intended to be limited to the property of permitting visible light to pass therethrough in a completely unattenuated manner. Stated differently, transparent or transparency as used herein means that at least the portion of the lure body which overlays a portion of the cavity 30 allows sufficient visible light to pass into the cavity such that an object therein which is not fully light transparent can be seen.

Received in cavity 30 is an insert shown generally as 34. Insert 34 comprises a spine 36 which in the embodiment shown in FIG.1 comprises a length of metal wire. As used herein, spine is intended to mean any, supporting inner structure or member to which an outer structure, defined hereafter can be fixedly or removably attached. Furthermore, in the preferred case, spine 36 is made of a material which is pliant or deformable but sufficiently stiff enough such that it can be formed into a desired shape and will retain that shape until a force is applied which returns it to its original shape or to another, desired shape. As noted, spine 36 supports an outer structure 38 which in the embodiment shown in FIG.1, comprises a plurality of bristles or whiskers which extend along the length of spine 36. Although structure 38 is shown as being comprised of bristles, whiskers or the like, structure 38 can be made of virtually any flexible material such as tuffs, an encapsulating wrap, etc. Structure 38, regardless of its physical form will be colored in the sense that it is not optically transparent as described above, and can comprise any color in the visible spectrum, or any combination of colors in the visible spectrum, black, white or any combination thereof. Thus, structure 38 can be of a single color or can be of multi colors, e.g., black and white, red and yellow, etc. As can also be seen from FIG.1, insert 34 has a tail portion 40 which extends through opening 32 for a reason described hereafter.

It will be understood that the shape of lure body 12 is purely exemplary and is no way intended to limit the numerous configurations which lure body 12 can take. In any event, it can readily be seen that insert 34, having a portion received in cavity 30, can be easily removed from cavity 30 simply by grasping tail 40 and pulling insert 34 through opening 32. In this regard, since the structure 38 is of a flexible material, even though structure 38 may have a cross-sectional area in its relaxed state which is greater than the cross-sectional area of the opening 32, because it is flexible, structure 38, being compliant will allow insert 34 to easily pass through opening 32. Additionally, since the outer structure 38 is flexible such that its cross-sectional area can be made larger than the cross-sectional area of opening 32, when inserted into lure body 12 through opening 32, outer structure 38 will engage the wall or walls forming opening 32 and effectively frictionally hold insert 34 in place.

The utility of the fishing lure 10 of the present invention can be readily appreciated from the fact that when lure 10 is connected to a fishing line via eyelet 16, its appearance can be changed simply by changing insert 34, for example, from an insert 34 having a structure 38 which is yellow to another insert 34 in which structure 38 is white. Thus, the fisherman only needs to grasp insert 34 by its tail 40, pull it out of cavity 30 through opening 32 and insert an alternative insert 34 through opening 30 back into cavity 30. It will be appreciated that the numerous inserts 34 of varying colors, multi-colored, etc., can be readily carried on the body of the fisherman in a small container, e.g., clear plastic box, such that the fisherman can readily choose the desired color of the structure 38. Further, since in the preferred embodiment, the spine 36 of insert 34 is pliant but yet stiff enough to be inserted through opening 32. It can be formed into a desired shape, e.g., sinuous, and threaded through opening 32, the sinuous shape being visible in cavity 30 through the transparent portion of body 12 which permits visual access to cavity 30.

Turning now to FIG. 2, there is shown a modification of the fishing lure of the present invention. The lure 10A shown in FIG. 2, has a body 42 which again is made of a transparent material as that word is defined above, and has a cavity 44 in which an insert shown generally as 46 is disposed. Unlike the embodiment shown in FIG. 1, insert 46 is wholly contained within cavity 44. Body 42 has a protrusion 47 in which is formed an opening 48 in which is received a removable plug 50. This feature allows cavity 44 to be partly or nearly completely filled with water or for that matter some other, colored liquid if desired, the liquid being retained in the cavity 44 since opening 48 is closed with plug 50. Indeed, in the embodiment shown in FIG. 2, cavity 44 could be filled with a liquid of one color and insert 46 could have an outer structure 52 of a different color, e.g., silver, gold or the like. Furthermore, since insert 46 is free to move in cavity 44, particularly if cavity 44 is not full of a liquid, movement of the lure through the water would result in movement of insert 46 enhancing the appearance of lure 10A.

As in the case of the lure shown in FIG. 1, lure 10A would be provided with an eyelet or some other connector to attach it to a fishing line and with one or more other eyelets, e.g., eyelet 54, for attachment to a fishing hook 56.

Referring now to FIG. 3 there is shown another embodiment of the present invention. The lure, shown generally as 10B in FIG. 3, has a body portion 58 with a cavity 60, cavity 60 as in the case of the lures shown in FIGS. 1 and 2 being overlaid by a transparent portion of body 58 which allows visible light into cavity 60. Lure body 58 is also provided with a protrusion 62 forming an opening 64 in which is received a removable plug 66. Attached to removable plug 66 is the spine 68 of an insert 70 having an outer structure 72. As in the case of the embodiment shown in FIG. 2, cavity 60 could be partially or completely filled with a liquid of a desired color or water, the structure 72 of insert 70 being of a different color as described above. It can also be seen that since an end of the spine 68 of insert 70 is attached to plug 66, to remove insert 70 from cavity 60, plug 66 is simply removed from opening 64. As in the case described above, insert 70 has an outer structure 72 which is compliant and can be pulled through opening 64. As seen, both plug 66 and plug 50 would generally be made of a flexible material, e.g., rubber, plastic or the like, which would snugly fit into the openings 48 and 64, respectively, so as to make cavities 44 and 60, respectively, water tight if desired, i.e., free from the ingress of water or, as discussed above, if filled with a colored liquid free from the egress of the liquid. It will be understood that the liquid can serve as a ballast and/or a color imparting substance viewable from the outside of the body of the lure.

Referring now to FIG. 4 there is shown still another embodiment of the present invention. The lure depicted in FIG. 4 and shown generally as 10C is comprised of a body portion 80 with an internal cavity 82, cavity 82 being overlaid by a transparent portion of body 80 for reasons described above. An opening 84 extends through body 80 into cavity 82. Body 82 is also provided with an eyelet 86 whereby a fishing line can be attached as well as eyelets 88 and 90 to which are attached hooks 92 and 94, respectively. Disposed in cavity 82 is a first insert shown generally as 96 and a second insert shown generally as 98. Insert 96 is provided with a spine or inner support member 100 to which is attached an outer structure 102 which, as shown comprises bristles or whiskers of a flexible material. Insert 96 has a tail portion 104 which extends out of opening 84.

Insert 98 has a spine or inner support member 106 to which is attached an outer structure 108, structure 108 comprising a plurality of bristles or whiskers attached to spine 106. Insert 98 also has a tail portion 110 which extends out of cavity 82 through opening 84. The lure 10C shown in FIG. 4 permits multiple inserts of different colors to be inserted into cavity 82. Additionally, depending on fishing conditions, the fish sought, etc., one or both of the inserts 96, 98 can be exchanged for one of a different color until a desired color combination is achieved which affords maximum fish attracting capability. Again, the bristle or whisker structures 102 and 108 provide frictional engagement between the wall defining opening 84 and the inserts 96 and 98 thereby holding them in place in the lure body 80.

Turning now to FIGS. 5 and 6, there is shown another embodiment of the present invention shown generally as 10D. Lure 10D has a lure body 120 which, as discussed above with respect to the other lure bodies, can be solely comprised of a transparent, generally plastic material albeit that it could be made of glass, but in any event has a transparent portion or portions which permit visual access to a first cavity 122 and a second cavity 124 in lure body 120. As can be seen, lure body 120 has an internal rib 126 which together with the outside walls making up lure body 120 define the two cavities 122 and 124. As in the case of the other lure bodies, lure body 120 is provided with an eyelet or other attachment member 128 by which lure 10D can be attached to a fishing line and is also provided with eyelets 130 and 132 for holding hooks 134 and 136, respectively. A first opening 138 extends through the wall of body 120 and is in open communication with first cavity 122 while a second opening 140 extends through the wall of lure body 120 providing open communication into cavity 124.

Disposed in cavity 122 is a first insert 142, insert 142 having a spine 144 and an outer structure 146 which as in the case of the other lure embodiments discussed above comprises bristles, whiskers or the like but which, in any event, is attached to spine 144 and is generally of a flexible nature. Insert 142 has a tail portion 150 which extends out through opening 138 so that, as described above, insert 142 can be easily inserted into or removed from cavity 122 simply by manually grasping tail 150 and moving it into cavity 122 or pulling it from cavity 122. Disposed in second cavity 124 is a second insert shown generally as 150 comprised of a spine or inner support member 152 and an outer structure 154 attached to spine 152, structure 154, as shown, being in the form of bristles, whiskers or the like, attached to spine 152 and being generally flexible in nature. Insert 150 also has a tail portion 158 which protrudes through opening 140. As in the case of the other inserts discussed above, insert 150 is designed such that the outer structure 154 can frictionally engage the walls forming the opening 140 so as to hold insert 150 in cavity 124. At the same time, tail portion 158 which can be manually grasped by the fisherman, permits easy insertion and removal of insert 150 into cavity 124. It will be appreciated that inserts 142 and 150 can be of different colors, each can be multi-colored but different, etc., to provide a wide selection of color combinations to thereby change the appearance of a lure.

In the descriptions given above, the insert has been described with respect to a spine or inner support member and an outer structure which is generally of flexible construction and is colored, either a single color or multi-colored. While all of the embodiments described above show the spine or inner support member as a length of wire which is pliant as defined above, it will be appreciated that the spine or support member is not so limited. For example, the spine and the outer structure could essentially be one and the same material, the only requirement being that there be sufficient flexibility of the outer structure portion to permit insertion or removal of the inserts through the various openings described above in the lure bodies and preferably frictionally engage the wall forming the opening into the cavity. It is also desirable, albeit not necessary, that the spine, when of a separate material than the outer structure, be pliant or deformable yet have sufficient stiffness so that it can be inserted through the openings in the lure body into the cavities. It is also contemplated that the spine could be made of an elongate member which is not pliant or deformable but which is flexible in the sense that if a bending force is applied to the spine, it will assume a second shape but will return to its original shape when the force is removed. Generally speaking, however, it is preferable that the spine be made of a pliant material since it can be formed into various shapes, e.g., a sinuous pattern, and retain that shape until it is straightened. In any event, regardless of whether the spine is pliant or merely flexible, it can be made form a length of metal wire or of certain plastics which are either pliant or flexible wherein pliant is intended to mean the capacity of being deformed into a given shape and remaining in that shape until formed into a different shape and whereas flexible is intended to describe a property wherein the spine can be formed into various shapes but possesses memory and returns to its original shape when any force which has been applied to force it into a specific shape is removed.

The lure of the present invention has been described above with respect to the outer colored structure being "attached" to the spine. It will be recognized that the outer structure can be removably attached to the spine as opposed to permanently attached, i.e., one spine could be used with different outer structures if desired. An insert can readily be made from a section of a smoking pipe cleaner. In this regard, packs of pipe cleaners of the tufted type come in assorted colors and are commonly used in arts and crafts.

The foregoing description and examples illustrate selected embodiments of the present invention. In light thereof, variations and modifications will be suggested to one skilled in the art, all of which are in the spirit and purview of this invention.

What is claimed is:

1. A fishing lure comprising:
   a body having a leading end, a trailing end and a hollow bulbous cavity, the volume of said cavity comprising the majority of the volume of said body and adapted to be connected to a fishing line, a transparent portion of said body at least partially exposing said cavity, said body having a single opening into said cavity toward said trailing end;
   an insert removably receivable through said opening, and in frictional engagement with said opening and having at least a portion extending into said cavity and a portion extending out of said opening, said insert comprising a spine and a flexible, outer structure of a colored material attached to said spine, said cavity having a substantially greater volume than said insert whereby said body can be ballasted with liquid, said insert being capable of free movement in said cavity.

2. The fishing lure of claim 1, wherein said spine is pliant.

3. The fishing lure of claim 1, wherein said spine is flexible.

4. The fishing lure of any one of claims 2 or 3, wherein said spine comprises a length of metal wire.

5. The fishing lure of claim 1, wherein said outer structure comprises a plurality of bristles.

6. The fishing lure of claim 1, wherein there is a removable plug in said opening.

7. The fishing lure of claim 1, wherein there is a removable plug in said opening and said insert is attached to said removable plug.

8. The fishing lure of claim 1, wherein there are a plurality of cavities and there are respective ones of said inserts in respective ones of said cavities.

9. The fishing lure of claim 1, wherein there are a plurality of inserts in said cavity.

10. The fishing lure of claim 1, wherein said insert is multi-colored.

11. The fishing lure of any one of claims 8 or 9, wherein the materials of respective ones of said inserts are of a different color.

12. The fishing lure of claim 1, wherein said outer structure frictionally engages said opening.

* * * * *